United States Patent
Hirae

(10) Patent No.: US 10,206,009 B2
(45) Date of Patent: Feb. 12, 2019

(54) CONTENTS PROCESSING DEVICE AND CONTENTS PROCESSING SYSTEM

(71) Applicant: Onkyo Corporation, Osaka (JP)

(72) Inventor: Ryo Hirae, Osaka (JP)

(73) Assignee: Onkyo Corporation, Osaka (JP)

( * ) Notice: Subject to any disclaimer, the term of this patent is extended or adjusted under 35 U.S.C. 154(b) by 101 days.

(21) Appl. No.: 14/887,471

(22) Filed: Oct. 20, 2015

(65) Prior Publication Data

US 2016/0119687 A1 Apr. 28, 2016

(30) Foreign Application Priority Data

Oct. 24, 2014 (JP) .................................. 2014-217050

(51) Int. Cl.
| | |
|---|---|
| *H04N 21/647* | (2011.01) |
| *H04L 12/28* | (2006.01) |
| *H04N 21/214* | (2011.01) |
| *H04N 21/436* | (2011.01) |
| *H04R 27/00* | (2006.01) |

(52) U.S. Cl.
CPC ... *H04N 21/64707* (2013.01); *H04L 12/2838* (2013.01); *H04N 21/2143* (2013.01); *H04N 21/43615* (2013.01); *H04L 2012/2849* (2013.01); *H04R 27/00* (2013.01); *H04R 2227/005* (2013.01)

(58) Field of Classification Search
CPC ...... H03F 3/189; H04N 5/148; H04N 5/4446; H04N 5/923; H04N 7/102; H04N 9/647; H04N 9/648
See application file for complete search history.

(56) References Cited

U.S. PATENT DOCUMENTS

| | | | |
|---|---|---|---|
| 2002/0124097 A1 | 9/2002 | Isely | |
| 2004/0117831 A1* | 6/2004 | Ellis | H04N 5/44543 725/53 |
| 2008/0065238 A1 | 3/2008 | Igoe | |
| 2009/0060227 A1 | 3/2009 | Kanoh | |
| 2010/0318911 A1 | 12/2010 | Holladay | |
| 2012/0327304 A1* | 12/2012 | Kashi | H04L 12/282 348/707 |

FOREIGN PATENT DOCUMENTS

JP 2013-005361 1/2013

OTHER PUBLICATIONS

Extended European Search Report dated Feb. 24, 2016 for corresponding European Application No. 15190788.8.

* cited by examiner

*Primary Examiner* — Benjamin R Bruckart
*Assistant Examiner* — Anthony Bantamoi
(74) *Attorney, Agent, or Firm* — Renner Otto Boisselle & Sklar, LLP

(57) ABSTRACT

There is provided a contents processing device of a contents processing system having a plurality of contents input units including network input units, a plurality of contents output units that is related to a plurality of zones and outputs the contents to the plurality of zones, respectively, an NET selector for outputting the contents input into the network input units to a specific contents output unit of the plurality of contents output units, and an NET selector controller for, when a receiving unit receives the contents reproduction notification, controlling an operation of the NET selector according to a predetermined NET selector procedure so that a user's estimated reproduction requirement is satisfied.

4 Claims, 3 Drawing Sheets

FIG. 3A

| Main zone | | Zone 2 | | Zone 3 | | Output state of contents on network |
|---|---|---|---|---|---|---|
| Zone output function on or off | NET selector control is made (NET) or not (other than NET) | Zone output function on or off | NET selector control is made (NET) or not (other than NET) | Zone output function on or off | NET selector control is made (NET) or not (other than NET) | |
| Off | | Off | | Off | | A |
| | | | | On | NET | E |
| | | | | | Other than NET | D |
| | | | NET | Off | | E |
| | | On | | On | NET | E |
| | | | | | Other than NET | E |
| | | | Other than NET | Off | | C |
| | | | | On | NET | E |
| | | | | | Other than NET | C |
| On | NET | Off | | Off | | E |
| | | | | On | NET | E |
| | | | | | Other than NET | E |
| | | | NET | Off | | E |
| | | On | | On | NET | E |
| | | | | | Other than NET | E |
| | | | Other than NET | Off | | E |
| | | | | On | NET | E |
| | | | | | Other than NET | E |
| | Other than NET | Off | | Off | | B |
| | | | | On | NET | E |
| | | | | | Other than NET | B |
| | | | NET | Off | | E |
| | | On | | On | NET | E |
| | | | | | Other than NET | E |
| | | | Other than NET | Off | | B |
| | | | | On | NET | E |
| | | | | | Other than NET | B |

FIG. 3B

| | |
|---|---|
| Change off into on, and change network service for outputting contents on network to main zone | A |
| Change network service for outputting contents on network to main zone | B |
| Change network service for outputting contents on network to zone 2 | C |
| Change network service for outputting contents on network to zone 3 | D |
| Change network service for changing contents on network | E |

CONTENTS PROCESSING DEVICE AND CONTENTS PROCESSING SYSTEM

BACKGROUND OF THE INVENTION

1. Field of the Invention

The present invention relates to a contents processing device and a contents processing system, and particularly relates to the contents processing device that can reproduce contents on a network and the contents processing system including the contents processing device and a controller on the network.

2. Description of the Related Art

Some contents processing devices such as AV amplifiers are multi-functionalized, and thus they have a multi-zone function for reproducing same or different contents in a plurality of zones (rooms) and a network service function for reproducing contents on a network such as an internet.

Unexamined Japanese Patent Publication No. 2013-5361 indicates that when a contents processing device connectable to a network has a plurality of zone (room) output functions, the contents processing device notifies a controller on the network about presence of the self device, but the device notifies about the self device only as one device. For this reason, since the controller on the network can simply specify the contents processing device as a reproduction destination of the contents on the network and different operations cannot be performed in the respective zones, the contents on the network are occasionally reproduced in zones other than a zone desired by a user.

In unexamined Japanese Patent Publication No. 2013-5361, the contents processing device sets device information about respective zone output functions as respective devices, and notifies the controller on the network about the device information. As a result, the controller on the network can perform different operations for the respective zone functions of the contents processing device.

A complicated processing is necessary for distinctively registering the plurality of output functions in the contents processing device into the controller on the network. When any zone of the multi-zones in which a user desires to reproduce the contents on the network can be estimated, a zone selector can be controlled according to an estimated reproduction requirement.

It is an object of the present invention to provide a contents processing device and a contents processing system which enable control of a zone selector so that contents on a network meet a user's estimated reproduction requirement.

SUMMARY OF THE INVENTION

A contents processing device of the present invention having a network service function for reproducing contents on a network includes a plurality of contents input units including a network input unit to be connected to the network, a plurality of contents output unit that is related to a plurality of zones and outputs the contents to contents reproducing devices arranged in the plurality of zones, respectively, an NET selector for outputting the contents input into the network input units to a specific contents output unit of the plurality of contents output units, a receiving unit that is provided between the network input units and the NET selector and receives transmission of a contents reproduction notification to the network input units, and an NET selector controller that communicates with the receiving unit and, when the receiving unit receives the contents reproduction notification, controls an operation of the NET selector according to a predetermined NET selector procedure so that a user's estimated reproduction requirement is satisfied.

In the contents processing device of the present invention, the predetermined NET selector procedure includes a zone-on determining procedure for determining whether the zone output functions for outputting the contents are ON in the plurality of zones, respectively, in the plurality of contents output units, a selected zone selector processing procedure for controlling the NET selector so that when the determination is made that the output function is not ON in any of the plurality of zones, a zone of which priority is high is selected in predetermined order of priority, the output function in the selected zone is turned ON and the contents input into the network input units are output to the contents output unit corresponding to the selected zone, an NET selector determining procedure for, when the determination is made that the output function in any of the plurality of zones is ON, determining whether the NET selector control for outputting the contents from the network input units to the contents output unit corresponding to the ON-zone is already made, an ON-zone selector processing procedure for controlling the NET selector so that when the determination is made that the NET selector control is not made on the ON-zone in the NET selector determining procedure, the contents input into the network input units are output to the contents output unit corresponding to the ON-zone, and a network service changing procedure for, when the determination is made that the NET selector control is not made on the ON-zone in the NET selector determining procedure, changing the contents to be output to the contents output unit corresponding to the ON-zone into contents input into the network input units.

In the contents processing device of the present invention, the predetermined priority is set such that the priority of a main zone is the highest.

Further, a contents processing system of the present invention includes the contents processing device, a network to be connected to network input units, a contents server on the network, and a controller on the network for transmitting a contents reproduction notification of the contents in the contents server to the contents processing device.

In the contents processing system of the present invention, the controller on the network allows controller information or processing information about contents to be reproduced to be included in the contents reproduction notification.

In the contents processing device having the above configuration, when transmission of the contents reproduction notification to the network input units is received, the operation of the NET selector is controlled according to a predetermined NET selector procedure so that the user's estimated reproduction requirement is satisfied. As a result, the contents on the network can be controlled by using the NET selector so that the user's estimated reproduction requirement is satisfied.

Further, in the contents processing device, the NET selector is controlled so that when the determination is made that the output function is not ON in any zone, a zone of which priority is high is selected in prefixed order of priority, the output function in the selected zone is turned ON and the contents input into the network input units are output to the contents output unit corresponding to the selected zone. This is because the user is normally estimated to demand reproduction on the zone of which priority is high. On the other hand, when the output function is ON in any of the plurality of zones and the contents corresponding to the ON-zone are already controlled through the NET selector so that the contents from the network input units are output, the contents to be output to the contents output unit corresponding to the ON-zone are changed into contents input into the network input units. This is because since the user already enjoys the contents on the network in the ON-zone, the user is estimated to desire to reproduce another contents on the network in the same zone. In such a manner, the NET selector can be controlled so that the contents on the network satisfy the user's estimated reproduction requirement.

Further, in the contents processing device, the predetermined priority is set so that the main zone has the highest priority. Since a reproducing device in the main zone is normally the most satisfactory, the user is estimated to demand the reproduction in the main zone.

Since the contents processing system having the above configuration includes a network to be connected with the network input units of the contents processing device, a contents server on the network, and a controller on the network for transmitting a notification of the reproduction of the contents in the contents server to the contents processing device, contents on the network can be reproduced by the contents reproducing device via the controller.

Further, in the contents processing system, the controller on the network allows controller information or processing information about the contents to be reproduced to be included in the contents reproduction notification. As a result, the contents processing device can obtain contents of the contents reproducing processing based on the reproduction notification of the controller.

BRIEF DESCRIPTION OF THE DRAWINGS

FIGS. 3(a) and 3(b) are diagrams showing contents of the NET selector control procedure in FIG. 2.

DETAILED DESCRIPTION OF PREFERRED EMBODIMENT

An embodiment of the present invention is described in detail below with reference to the drawings. The following describes a case where a number of zones is three, but this is an example of description, and any number of zones other than three may be used as long as the plurality of zones exists. Further, a main zone, a zone 2, and a zone 3 are selected in order of decreasing priority in zone selection, but this is an example for the description, and thus another order of priority may be applied. Further, in the description, the contents processing device is placed in the main zone, but the contents processing device may be placed in any zone other than the main zone. The following describes DVD, CD, HDD, a contents server on a network, and an internet radio as sources of contents, but they are examples, and thus not all of them may be included and the other cases may be applied.

In the following, like elements are denoted by like reference symbols and overlapped description is omitted in all the drawings.

Figure 1:
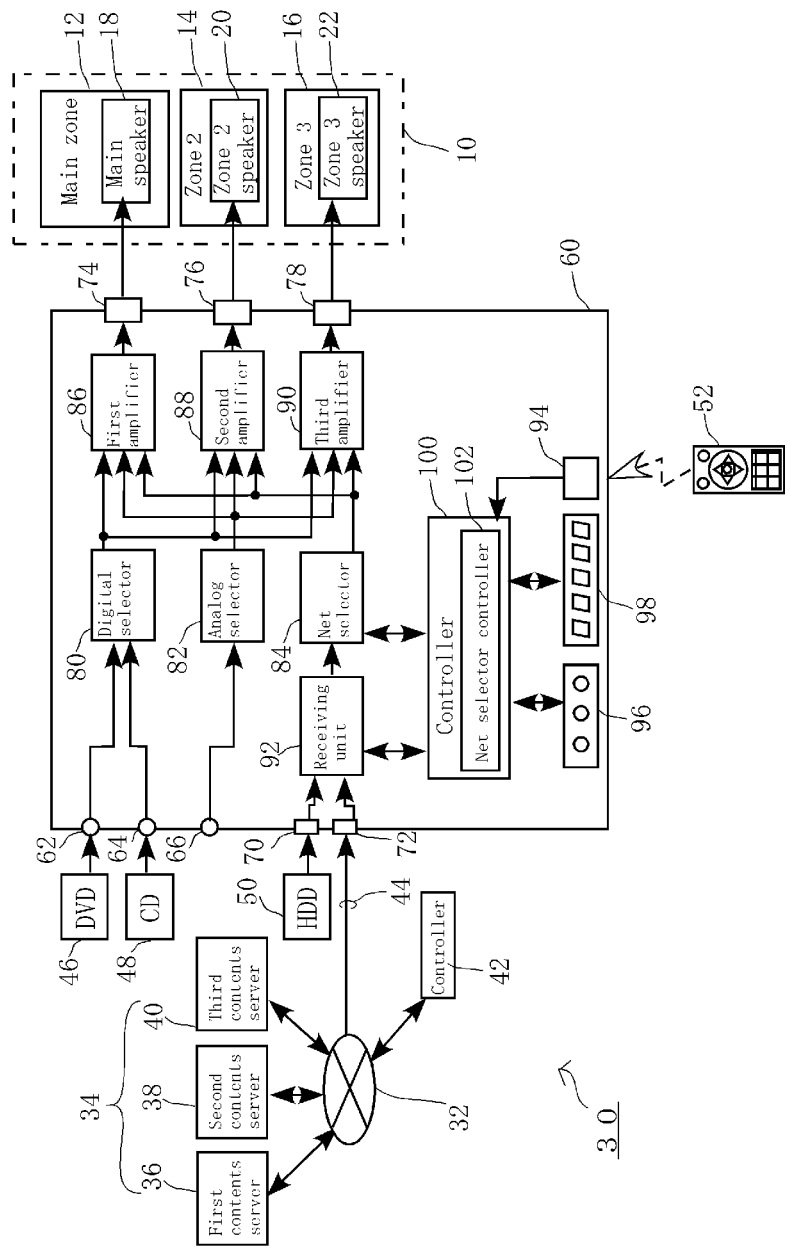
FIG. 1 is a constitutional diagram showing a contents processing system including a contents processing device according to an embodiment of the present invention.

FIG. 1 is a constitutional diagram of a contents processing system 30. The contents processing system 30 includes a contents source 34 on a network to be connected to a network 32, a controller 42 to be connected to the network 32, and a contents processing device 60.

FIG. 1 illustrates a plurality of zones 10 that is not a component of the contents processing system 30 but where a user enjoys viewing or the like. The plurality of zones 10 is facilities such as buildings and has a plurality of areas. The plurality of areas where a reproducing device such as a speaker is disposed for the user to enjoy viewing contents is called zones. A reproducing apparatus other than the speaker includes an image monitor and a headphone. In an example of FIG. 1, as the plurality of zones 10, a main zone 12, a zone 14 called a zone 2, and a zone 16 called a zone 3 are illustrated. A reproducing device such as a main speaker 18 is disposed in the main zone 12, and the contents processing device 60 is also disposed in this main zone. The main speaker 18 is configured by, for example, a group of seven speakers. A reproducing device such as a zone 2 speaker 20 is disposed in the zone 14, and a reproducing device such as a zone 3 speaker 22 is disposed in the zone 16. The zone 2 speaker 20 and the zone 3 speaker 22 are configured by, for example, groups of two speakers.

The reproducing devices are provided in the main zone 12 more sufficiently than the zones 14 and 16, and thus the zone 12 is suitable for a lot of people to gather and enjoy the same contents like a home theater. The reproducing devices are less in the zones 14 and 16 than the main zone 12, and thus the zones 14 and 16 are suitable for a user to personally enjoy contents. The plurality of zones 10 is classified into three zones, but different contents can be also reproduced individually in the respective zones by control of the contents processing device 60, the same contents can be reproduced in the two zones, or the same contents can be reproduced in all the zones.

In the above description, the plurality of zones 10 is formed by three zones but may be formed by three or more zones. In this case, also a number of contents output units, described later, is increased according to the numbers of zones, and a number of amplifiers is also increased according to the number of the zones.

Before description about the contents of the contents processing device 60, the contents source 34 on the network 32 to be connected to the contents processing device 60, and the controller 42 to be connected to the network 32 are described first.

A plurality of devices is connected to the network 32 for their communication, and the network 32 is an information transmission/reception network for transmission/reception of information such as contents between the plurality of devices. One example of the network 32 is an internet.

The contents source 34 on the network is a device for holding contents as one of network services to be provided via the network 32. FIG. 1 illustrates a first contents server 36, a second contents server 38, and an internet radio 40 as the contents source 34 on the network in the way of example. One or more contents are stored in the first contents server 36 and the second contents server 38, respectively. The contents source 34 is connected to the network 32.

The controller 42 to be connected to the network 32 is a control device that has a function for transmitting a reproduction notification to the contents processing device 60 via the network 32 when the user selects contents on the network and desires to reproduce the selected contents using the reproducing devices in the plurality of zones 10.

The reproduction notification includes information relating to contents to be reproduced as well as information relating to how to reproduce the contents from the controller 42 or information relating to a reproducing process for the contents to be reproduced. The reproduction notification does not include information relating to a multi-zone such as any of the plurality of zones 10 where the reproduction is carried out. The information relating to the multi-zone should be registered in the controller 42 in advance for making the information relating to the multi-zone be included in the reproduction notification. However, since this registering process is very complicated as described in Unexamined Japanese Patent Publication No. 2013-5361, the reproduction notification does not include the information relating to the multi-zone.

A network cable 44 is a LAN cable that connects the network 32 and the contents processing device 60, and transmits reproduction notification from the controller 42 and selected contents to the contents processing device 60.

A digital video driver 46 represented by DVD, a compact disc player 48 represented by CD, and a high volume hard disc 50 represented by HDD in FIG. 1 are the contents sources of the contents processing device 60. They are the contents sources other than the contents on the network. The digital video driver 46 and the compact disc player 48 are connected to the contents processing device 60 via a dedicated connection cable, but the high volume hard disc 50 is connected to the contents processing device 60 via an USB cable.

Further, a remote controller 52 shown in FIG. 1 is a control terminal that can communicate with the contents processing device 60 via a wireless signal. The remote controller 52 can control an on/off operation of a power source of the contents processing device 60, and can control setting of respective functions of the contents processing device 60.

The above is description about the respective devices around the contents processing device 60. Contents of the contents processing device 60 are described below. The contents processing device 60 is a device for processing contents to be input from the source so that the contents can be reproduced by the plurality of reproducing devices in the plurality of zones 10. The contents processing device 60 is called an AV amplifier or the like. The contents processing device 60 has a network service function for reproducing the contents on the network and a multi-zone function for reproducing the contents using the plurality of reproducing devices in the plurality of zones 10.

The contents processing device 60 has a plurality of contents input units 62, 64, 66, 70, and 72. The contents input units 62 and 64 are input terminals into which digital data contents are input. The contents input unit 62 is a digital data input terminal into which contents are input from the digital video driver 46, and to which a dedicated cable drawn out from an output terminal of the digital video driver 46 is connected. The contents input unit 64 is a digital data input terminal into which contents are input from the compact disc player 48 and to which a dedicated cable drawn out from an output terminal of the compact disc player 48 is connected.

The contents input unit 66 is a terminal into which analog data contents are input, but a device having analog data contents is not connected yet in FIG. 1.

The contents input unit 70 is a terminal into which contents are input from the high volume hard disc 50, and is an USB connection terminal to which an USB cable drawn out from an output terminal of the high volume hard disc 50 is connected.

The contents input unit 72 is a terminal to which the network cable 44 is connected and into which a reproduction notification from the controller 42 and contents from the contents source 34 on the network are input, and an LAN connection terminal to which a LAN terminal of the network cable 44 is connected. In an example of the contents processing device 60 in FIG. 1, only one LAN connection terminal of the contents input unit 72 exists. When the contents input unit 72 is distinguished from the other input units, the contents input unit 72 is called a network input unit.

The contents processing device 60 has a plurality of contents output units 74, 76, and 78. The plurality of contents output units 74, 76, and 78 is related to the main zone 12, the zone 14, and the zone 16 forming the plurality of zones 10, and is output terminals having a function for outputting contents to the contents reproducing devices disposed in the plurality of zones 10, respectively.

In the example of FIG. 1, the contents output unit 74 is a group of a plurality of connection terminals to which a plurality of data signal lines drawn out from input terminals of the plurality of reproducing devices such as the main speaker 18 disposed in the main zone 12 is connected, and is a main zone connection terminal. The contents output unit 76 is a group of a plurality of connection terminals to which a plurality of data signal lines drawn out from input terminals of the plurality of reproducing devices such as the zone 2 speaker 20 disposed in the zone 14 is connected, and is a zone 2 connection terminal. The contents output unit 78 is a group of connection terminals to which a plurality of data signal lines drawn out from input terminals of the plurality of reproducing devices such as the zone 3 speaker 22 disposed in the zone 3 is connected, and is a zone 3 connection terminal.

A digital selector 80 is a zone selector that is connected to the contents input units 62 and 64 and selects any contents output unit to which contents to be input from the digital video driver 46 or the compact disc player 48 are to be output from the three contents output units 74, 76, and 78. When the contents output unit 74 is connected, the contents are reproduced by the reproducing device such as the main speaker 18 in the main zone 12. When the contents output unit 76 is connected, the contents are reproduced by the reproducing device such as the zone 2 speaker 20 in the zone 14. When the contents output unit 78 is connected, the contents are reproduced by the reproducing device such as the zone 3 speaker 22 in the zone 16.

The digital selector 80 can make a determination so that the same contents are output to the two or more contents output terminals. For example, the same contents can be output to all the three contents output units 74, 76, and 78, and in this case, the reproducing device such as the main speaker 18 in the main zone 12, the reproducing devices such as the zone 2 speaker 20 in the zone 14, and the reproducing device such as the zone 3 speaker 22 in the zone 16 reproduce the same contents at the same time.

An analog selector 82 is a zone selector that is connected to the contents input unit 66 and, not illustrated in FIG. 1, selects any of the three contents output units 74, 76, and 78 to which contents to be input from the device having analog contents are to be output.

An NET selector 84 is a zone selector that is connected to the contents input units 70 and 72 and selects any of the three contents output units 74, 76, and 78 to which contents to be input from the high volume hard disc 50 or the contents source 34 on the network are to be output. The output destination of the contents from the high volume hard disc 50 is determined by the NET selector 84 because the contents input unit 70 is the USB terminal and a dedicated selector is not provided at the present. The following describes a case where the NET selector 84 is connected to the contents input unit 72 that is the network input unit.

A first amplifier 86, a second amplifier 88, and a third amplifier 90 are connected to the contents output units 74, 76, and 78, respectively, and amplify contents to be output via the digital selector 80, the analog selector 82, and the NET selector 84. The digital selector 80, the analog selector 82, and the NET selector 84 are zone selectors for selecting any of the three contents output units 74, 76, and 78 to which contents are output, but a zone selector for determining input into the first amplifier 86, the second amplifier 88, and the third amplifier 90 may be separately provided.

A receiving unit 92 is provided between the contents input units 70 and 72 and the NET selector 84. When the NET selector 84 is connected to the contents input unit 72, the receiving unit 92 receives a reproduction notification to be transmitted from the controller 42 via the network 32 and contents data on the network. Since the receiving unit 92 communicates with a controller 100, the received reproduction notification is transmitted to an NET selector controller 102 of the controller 100.

Some or all of the functions of the digital selector 80, the analog selector 82, the NET selector 84, and the receiving unit 92 are processed by DSP (Digital Signal Processor) not illustrated in FIG. 1.

The controller 100 is a CPU for generally controlling operations of respective elements of the contents processing device 60. Particularly in this case, a determination is made whether a zone output function for outputting contents to the plurality of zones 10 is turned ON in the contents output units 74, 76, and 78, and a process for turning ON the zone output function for outputting contents in a predetermined zone is executed if necessary. Turning-ON the zone output function is a process for turning ON the power source of the reproducing device in a corresponding zone and controlling the operations of the digital selector 80, the analog selector 82, and the NET selector 84 so as to allow the contents to flow in the predetermined zone.

The controller 100 has the NET selector controller 102 for controlling the operation of the NET selector 84 according to an NET selector procedure predetermined according to a user's estimated reproduction requirement when the receiving unit 92 receives the reproduction notification. The controller 100 executes an NET selector control program so as to control the operation of the NET selector 84 according to the predetermined NET selector procedure.

As the user's estimated reproduction requirement, the following is considered. In one example, the user is estimated to normally desire reproduction in a zone such as the main zone 12 which is sufficiently equipped with the reproducing devices. The user is estimated to demand reproduction in a zone with predetermined high priority other than the main zone 12. For example, when the reproducing device such as the speaker suitable for the reproduction of contents on the network 32 is collected in the zone 2, the user is estimated to demand the reproduction in the zone 2. In another example, when the user already enjoys contents on the network in any zone and desires to enjoy another contents on network, the user is estimated to demand reproduction in the same zone. The NET selector procedure predetermined so as to meet the user's estimated reproduction requirement is described later with reference to FIGS. 2 and 3.

In FIG. 1, a remote signal obtaining unit 94 is a signal obtaining window at a time when a control signal from the remote controller 52 is obtained through wireless communication such as infrared communication. In the case of infrared communication, a phototransistor or the like that is sensitive to an infrared ray is disposed in the remote signal obtaining unit 94. A zone setting button 96 is a user setting button to be used when any of the contents output units to which contents to be input from the contents input units 62, 64, and 64 are transmitted is determined in advance mainly in the digital selector 80 and the analog selector 82. A display unit 98 displays an operation status or the like of the contents processing device 60, and is configured by, for example, a liquid crystal display or light-emitting diode display for one-line display. The remote signal obtaining unit 94, the zone setting button 96, and the display unit 98 are connected to the controller 100.

Figure 2:
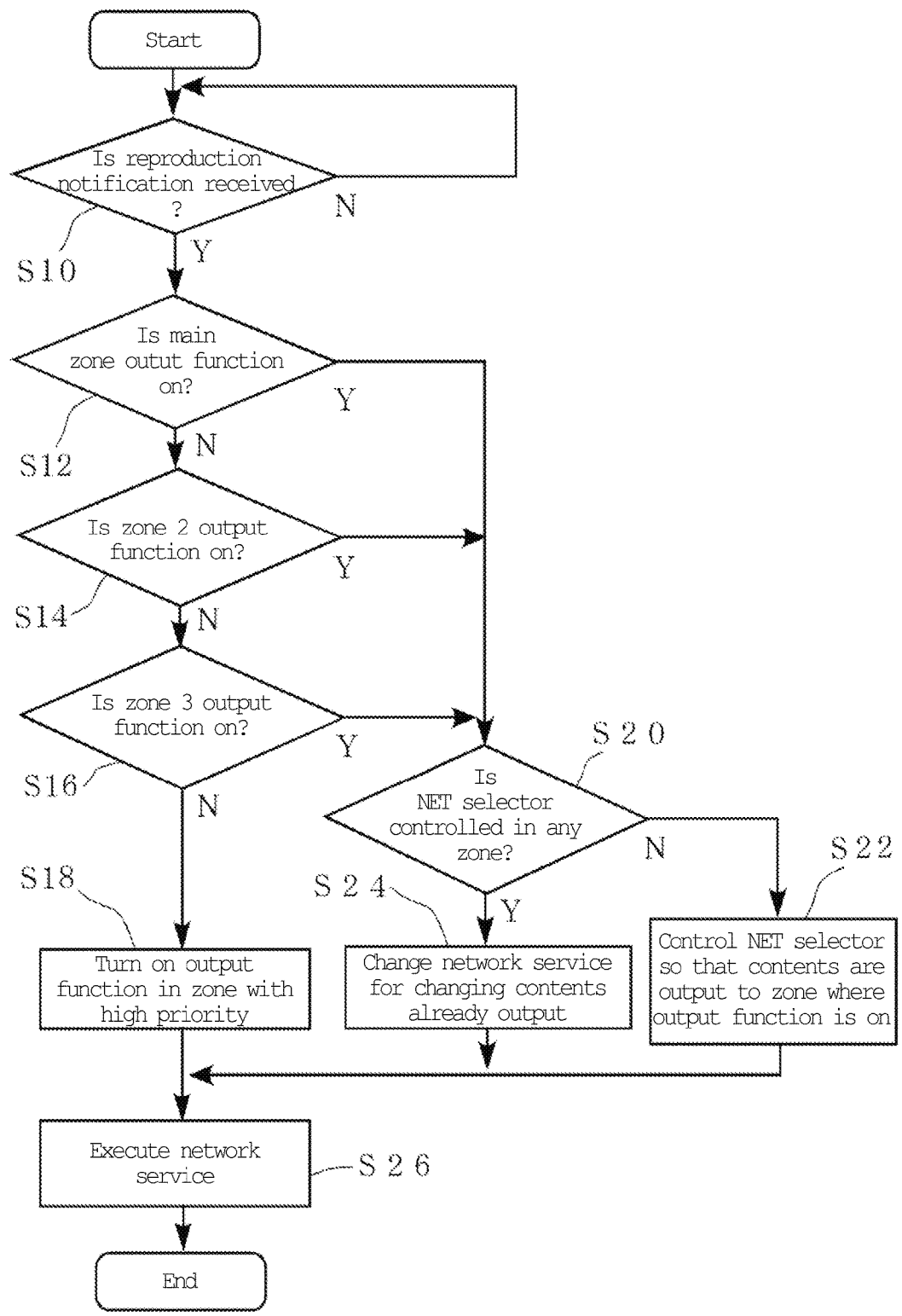
FIG. 2 is a diagram showing an example of an NET selector control procedure to be executed by the contents processing device according to the embodiment of the present invention.

A function of the above constitution, particularly the function of the NET selector controller 102 is further described in detail with reference to FIG. 2 and FIG. 3. FIG. 2 is a flowchart illustrating the predetermined NET selector procedure to be executed in the NET selector controller 102 of the controller 100. Respective steps in FIG. 2 correspond to respective processing steps of the NET selector control program.

When The NET selector control program is started, a determination is made whether the receiving unit 92 receives the reproduction notification (S10). When the determination at S10 is No, the process returns to S10, and when the determination at S10 is Yes, the process goes to S12 and subsequent procedures.

When the determination at S10 is Yes, a determination is made whether a main zone output function for outputting contents to the reproducing device such as the main speaker 18 in the main zone 12 is ON (S12). When the determination at S12 is Yes, the process goes to step S20. When the determination at S12 is No, a determination is made whether a zone 2 output function for outputting contents to the reproducing device such as the zone 2 speaker 20 in the zone 14 is ON (S14). When the determination at S14 is Yes, the process goes to S20. When the determination at S14 is No, a determination is then made whether a zone 3 output function for outputting contents to the reproducing device such as a zone 3 speaker 20 in the zone 16 is ON (S16). The respective processing steps S12, S14, and S16 are called respective zone ON determining procedure. When the determination at S16 is Yes, the process goes to S20.

When the determination at S16 is No, the output function is not ON in any of the plurality of zones. In this case, the zone with high priority is selected on predetermined order of priority, and the output function in the selected zone is turned ON (S18).

As the predetermined priority, a zone sufficiently equipped with the reproducing devices has a high priority. In the example of FIG. 1, the main zone 12 has the highest priority. Any of the zone 14 and the zone 16 that is equipped with the reproducing devices more sufficiently has a priority next to the main zone 12. When the zones are equipped with the reproducing devices equivalently sufficient, for example, the zone 14 that is named as the zone 2 has a priority next to the main zone 12. When the reproducing device such as the speaker suitable for the reproduction of the contents on the network 32 is collected more in the zone 14 or the zone 16 than the main zone 12, the priority of this zone may be the highest. The output function in the zone having a high priority is ON because normally the user is estimated to demand the reproduction in a zone such as the main zone 12 which is sufficiently equipped with the reproducing devices.

When the main zone 12 is selected by the process at S18, the output function of the main zone 12 is turned ON, and the NET selector 84 is controlled so that the contents input into the contents input unit 72 that is the network input unit are output to the contents output unit 74 corresponding to the main zone 12. This processing procedure is called a selected zone selector processing procedure. As a result, a network service for outputting the contents on the network to the main zone 12 is executed (S26).

The determinations at S12, S14, and S16 are Yes when the determination is made that the output function in at least any zone of the plurality of zones 10 is ON. At this time, an NET selector determining procedure for determining whether an NET selector control for outputting the contents from the contents input unit 72 that is the network input unit to the contents output unit corresponding to the ON-zone is already made is executed (S20). Since the only one contents input unit 72 exists as the network input unit, the number of a zone where the NET selector control is already made is one.

When the determination at S20 is No, the zone output function is ON but the control of the NET selector 84 is not made in the main zone 12, the zone 14, and the zone 16. At this time, an ON-zone selector processing procedure for controlling the NET selector 84 so that the contents input into the contents input unit 72 that is the network input unit in the predetermined zone with the highest priority in the zones where the output functions are ON are output to the contents output unit corresponding to the ON-zone is executed (S22).

When the determination at S20 is YES, a network service changing process is executed so that the contents to be output to the contents output unit corresponding to the zone where the determination at S20 is YES are changed into the contents input into the contents input unit that is the network input unit (S24). In the zone where the determination at S20 is Yes, since the user is enjoying or already enjoys the contents on the network, new contents input into the contents input unit that is the network input unit are output to that zone instead of the contents the user is enjoying or already enjoys. That is to say, the network service is changed so that the last contents on the network are changed into new contents on the network in the same zone regardless of priority. This is because when the user already enjoys the contents on the network in any zone and then desires to enjoy another contents on the network, the user is estimated to demand the reproduction in the same zone.

When steps S18, S22, and S24 are executed, the network service is executed according to these steps so that the contents on the network are output to the reproducing device in any zone (S26).

According to the processing procedure in FIG. 2, the contents on the network can be output to a zone that satisfies the user's estimated reproduction requirement by using the contents processing device 60.

FIG. 3 is a diagram illustrating how the process in FIG. 2 is executed in respective states of the main zone 12, the zone 14, and the zone 16. As to the priority, the main zone 12, the zone 14, and the zone 16 are illustrated in order of decreasing priority. FIG. 3(a) is a diagram illustrating respective 27 cases in the three zones and output states of the contents on the network as results of executing the procedure in FIG. 2 in the respective cases. FIG. 3(b) is a diagram where the output states of the contents on the network are classified into five states: A to E.

The 27 cases in the three zones are combinations of "the zone output function is ON or OFF", and "the NET selector control is made and the contents on the network are already output (abbreviated as NET) or not, and the NET selector control is not made and contents other than the contents on the network are already output (abbreviated as any other than NET) or not" when the zone output function is ON.

For example, the cases at the top in FIG. 3(a) are "the zone output function is OFF in the main zone" (the determination at S12 in FIG. 2 is No), "the zone output function is OFF in the zone 2" (the determination at S14 in FIG. 2 is No), and "the zone output function is OFF in the zone 3" (the determination at S16 in FIG. 2 is No). The output state of the contents on the network in these cases is such that A "the zone output function in the main zone with highest priority is changed OFF into ON, and the network service for outputting the contents on the network to the main zone is changed" in FIG. 3(b) (S18 and S20 in FIG. 2).

The cases just below the top in FIG. 3(a) are such that "the zone output function is OFF in the main zone" (the determination at S12 in FIG. 2 is No), "the zone output function is OFF in the zone 2" (the determination at S14 in FIG. 2 is No), "the zone output function is ON in the zone 3" (the determination at S16 in FIG. 2 is Yes), and "the NET selector control is already made in the zone 3" (the determination at S20 in FIG. 2 is Yes). The output state of the contents in these cases is such that E "the network service is changed so that the contents on the network output in the zone 3 are changed into new contents" (S24 and S20 in FIG. 2).

The cases two lines below from the top in FIG. 3(a) are such that "the zone output function is OFF in the main zone" (the determination at S12 in FIG. 2 is No), "the zone output function is OFF in the zone 2" (the determination at S14 in FIG. 2 is No), "the zone output function is ON in the zone 3" (the determination at S16 in FIG. 2 is Yes), and "the NET selector control is not made in the zone 3" (the determination at S20 in FIG. 2 is NO). The output state of the contents on the network in these cases is D "the NET selector control is made so that the network service for outputting the contents on the network to the zone 3 is changed" (S22 and S26 in FIG. 2).

Since the similar description can be applied to the other cases, detailed contents of them are omitted.

What is claimed is:

1. A contents processing device having a network service function for reproducing contents on a network comprising:
   a plurality of contents input units including network input units, wherein the network input units are to be connected to the network;
   a plurality of contents output units that is related to a plurality of zones and is adapted to output the contents to contents reproducing devices disposed in the plurality of zones, respectively;
   an NET selector for outputting the contents input into the network input units to a specific contents output unit of the plurality of contents output units;
   a receiving unit that is provided between the network input units and the NET selector and is adapted to receive transmission of a contents reproduction notification to the network input units, wherein the contents reproduction notification includes controller information or processing information about contents to be reproduced; and
   an NET selector controller that is adapted to communicate with the receiving unit and when the receiving unit receives the contents reproduction notification, is adapted to control an operation of the NET selector according to a predetermined NET selector procedure so that a user's estimated reproduction requirement is satisfied,
   wherein the predetermined NET selector procedure includes:

a zone-on determining procedure for automatically determining whether a zone output function for outputting the contents is ON in the plurality of zones, respectively, in the plurality of contents output units, an NET selector determining procedure for, when the determination is made that the output function in any of the plurality of zones is ON, automatically determining that content may be already being reproduced from the network input units in an ON-zone by determining whether a NET selector control for outputting the contents from the network input units to the contents output unit corresponding to the ON-zone is already made, and a network service changing procedure for, when the determination is made that content may be already being reproduced from the network input units in the ON-zone as a result of determining the NET selector control has already been made on the ON-zone in the NET selector determining procedure, changing the contents to be output to the contents output unit corresponding to the ON-zone into contents input into the network input units, and further comprising a selected zone selector processing procedure for controlling the NET selector so that when the determination is made that the output function is not ON in any of the plurality of zones, a zone of which priority is high is selected in predetermined order of priority, the output function in the selected zone is turned ON and the contents input into the network input units are output to the contents output unit corresponding to the selected zone, and an ON-zone selector processing procedure for controlling the NET selector so that when the determination is made that the NET selector control is not made on the ON-zone in the NET selector determining procedure, the contents input into the network input units are output to the contents output unit corresponding to the ON-zone.

2. The contents processing device according to claim 1, wherein the predetermined priority is set so that a main zone has highest priority.

3. A contents processing system comprising:
the contents processing device of claim 1;
a network to be connected to the network input units;
a contents server on the network; and
a controller on the network for transmitting a reproduction notification of the contents in the contents server to the contents processing device.

4. The contents processing system according to claim 3, wherein
the controller on the network allows controller information or processing information about the contents to be reproduced to be included in the reproduction notification of the contents.

* * * * *